United States Patent
Perry et al.

(10) Patent No.: US 11,040,281 B2
(45) Date of Patent: Jun. 22, 2021

(54) MULTI-USER DEMO STREAMING SERVICE FOR CLOUD GAMING

(71) Applicant: Sony Interactive Entertainment America LLC, San Mateo, CA (US)

(72) Inventors: David Perry, Monarch Beach, CA (US); Jee Yoon Choi, Aliso Viejo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 719 days.

(21) Appl. No.: 15/268,478

(22) Filed: Sep. 16, 2016

(65) Prior Publication Data

US 2017/0087464 A1    Mar. 30, 2017

Related U.S. Application Data

(60) Provisional application No. 62/235,435, filed on Sep. 30, 2015.

(51) Int. Cl.
    *A63F 13/497*     (2014.01)
    *A63F 13/352*     (2014.01)
    (Continued)

(52) U.S. Cl.
    CPC .......... *A63F 13/497* (2014.09); *A63F 13/335* (2014.09); *A63F 13/352* (2014.09);
    (Continued)

(58) Field of Classification Search
    CPC .... A63F 13/497; A63F 13/335; A63F 13/352; A63F 13/355; A63F 13/48; A63F 13/493
    See application file for complete search history.

(56) References Cited

U.S. PATENT DOCUMENTS 7,695,370 B2 *    4/2010    Liu .................... A63F 13/12
                                                                        463/42
2013/0260896 A1    10/2013    Miura et al.
(Continued)

FOREIGN PATENT DOCUMENTS

CN      103902808 A    7/2014   ............. G06F 19/00
EP      2 745 893 A2    6/2014   ........... A63F 13/335
(Continued)

OTHER PUBLICATIONS

International Search Report and Written Opinion from PCT/US2016/052349, dated Dec. 22, 2016.
(Continued)

*Primary Examiner* — William H McCulloch, Jr.
(74) *Attorney, Agent, or Firm* — Penilia IP, APC

(57) ABSTRACT

Systems and methods are provided for generating demonstration gameplay streaming via a cloud gaming system. The method includes executing a game from a library of games managed by the cloud gaming system. The executing causing the game to launch and progress to a gaming session where modules of the game are pre-loaded and waiting for interactive input of the game. The method includes advancing, by the cloud gaming system, in the game from a level to a later level in the game. Then pausing the game on the cloud gaming system and generating a post that is indicative of the game and the later level. The post being displayed on a website, and wherein the executing of the game, the advancing and the pausing being processed by the cloud gaming system without user input. In some embodiments, other users can advance the gameplay, and other users can resume play from where they left off, without needed to re-load the game.

16 Claims, 11 Drawing Sheets

(51) Int. Cl.
*A63F 13/335* (2014.01)
*A63F 13/493* (2014.01)
*A63F 13/48* (2014.01)
*A63F 13/355* (2014.01)

(52) U.S. Cl.
CPC ............ *A63F 13/355* (2014.09); *A63F 13/48* (2014.09); *A63F 13/493* (2014.09)

(56) References Cited

U.S. PATENT DOCUMENTS

| | | | | |
|---|---|---|---|---|
| 2014/0179428 A1* | 6/2014 | Miura | ...................... | A63F 13/12 463/31 |
| 2014/0187314 A1* | 7/2014 | Perry | ...................... | A63F 13/10 463/29 |
| 2014/0342819 A1* | 11/2014 | Bruno, Jr. | ............... | A63F 13/12 463/29 |
| 2015/0264298 A1* | 9/2015 | Colenbrander | ........ | H04N 7/013 345/547 |
| 2016/0256775 A1* | 9/2016 | Gustafson | ............. | A63F 13/493 |
| 2017/0095741 A1 | 4/2017 | Perry et al. | ............. | A63F 13/86 |

FOREIGN PATENT DOCUMENTS

| | | | | |
|---|---|---|---|---|
| EP | 2745894 | 6/2014 | | |
| JP | 2008527851 A | 7/2008 | ............. | H04N 7/173 |
| JP | 2014-121610 | 3/2014 | ............. | A63F 13/79 |

OTHER PUBLICATIONS

Japanese Application No. 2018-516774, Notice of Reason(s) for Refusal, Dispatch No. 110288, dated Mar. 19, 2019.
Chinese Application No. 201610873798.X, The First Office Action, Issuing No. 2020022701681830, dated Mar. 3, 2020.

* cited by examiner

MULTI-USER DEMO STREAMING SERVICE FOR CLOUD GAMING

CLAIM OF PRIORITY

This application claims priority to U.S. Provisional Application No. 62/235,435, filed Sep. 30, 2015, entitled "Multi-User Demo Streaming Service for Cloud Gaming", the disclosure of which is incorporated by reference herein.

FIELD OF THE DISCLOSURE

The present disclosure relates to systems and methods for demo mode operation for games executed by cloud gaming systems, wherein games are preloaded and ready to be instantly played at specific levels, and enabling users to resume play where other users left off.

BACKGROUND

Cloud systems deliver services over a network (typically the Internet) using computing resources (hardware and software). The services, in the context of gaming, enable streaming of content to remote clients, wherein most processing is done on servers, which may be distributed. Input provided at the remote clients will in turn drive execution of the game on the servers, without the need for dedicated gaming hardware at the client's location. Due to the ease of accessing the games executing on the cloud systems, cloud gaming has been increasing in popularity because users find it easier to access more titles without complex hardware restrictions. Similarly, game suppliers find it easier to manage game code from centralized locations.

Unfortunately, cloud gaming systems still require users to wait a certain period of time while games are loaded and ready to be played. The reason load time can be substantial is that games are increasing in complexity and sophistication, which requires software to be instantiated and properly loaded before active gameplay can be enabled. As the graphics and complexity continue to increase, game load times will similarly continue to increase. Additionally, users wishing to test out certain games or game features, must either purchase the entire game or once purchased are required to play through multiple levels until levels of interest are reached.

It is in this context that embodiments of the disclosure arise.

SUMMARY

Embodiments of the present disclosure relate to systems and methods for cloud gaming systems that enable instant play of games at specific points in the game, without requiring wait time associated with loading of the game. In specific embodiments, methods are provided to enable users to play games up to a certain point in time, and then allow another user to resume play from where the prior user left off. In one example, games may be provided with prior play options, which show where other players had left off, and providing the user for instant play to resume where that player had left off. In still other embodiments, methods are provided to enable the cloud gaming system to generate a plurality of different start points within the game, e.g., levels, and thus enable users wishing a demonstration of the game to simply play that specific level. In such embodiments, users are provided with the ability to review prior gameplay up to and leading up to that particular level of interest.

In this manner, users are provided with a summary of the type of gameplay and activity that occurred before the user attempts instant play of that specific level. In still another embodiment, users are provided with the ability to view other users streaming an instance of the game. The user that was viewing the other user playing the game, can then resume play where the prior user left off. In one embodiment, the games are allowed to be resumed by other users, without requiring the game to be preloaded. For example, games remain loaded and ready for instant play at various points, depending on where players left off or depending on which levels were created and loaded for users to demo. By enabling this functionality, users accessing a website of a cloud gaming system can select titles and instantly be allowed to demo certain levels of the game, without requiring preloading of the game or purchase of the entire game.

By providing this functionality, wait times are reduced, and resources associated with loading are eliminated or reduced. In some embodiments, maintaining certain levels or prior gameplays active in a pause state, reduces processing power required to reboot the game and proceed through various splash screens, introductions, and or earlier levels. This functionality therefore technically reduces power consumption, and execution time that may be wasted by servers of a data center.

In one embodiment, a method is provided for generating demonstration gameplay streaming via a cloud gaming system. The method includes executing a game from a library of games managed by the cloud gaming system. The executing causing the game to launch and progress to a gaming session where modules of the game are pre-loaded and waiting for interactive input of the game. The method includes advancing, by the cloud gaming system, in the game from a level to a later level in the game. Then, pausing, the game on the cloud gaming system and generating a post that is indicative of the game and the later level. The post being displayed on a website, and wherein the executing of the game, the advancing and the pausing being processed by the cloud gaming system without user input. In some embodiments, other users can advance the gameplay, and other users can resume play from where they left off, without needed to re-load the game.

In another embodiment, a method for generating demonstration gameplay streaming via a cloud gaming system is provided. The method includes executing a game from a library of games managed by the cloud gaming system. The executing causing the game to launch and progress to a gaming session where modules of the game are loaded and waiting for interactive input of the game. The method further enables gameplay of the game by a first user during the gaming session. The first user progressing in the game up to first point of gameplay. The system then maintains the gaming session active, such that the modules of the game remain loaded and waiting for interactive input of the game. The method further includes saving a recording of a portion of the gameplay up to the first point of gameplay and posting an indicator for the game to a webpage of the cloud gaming system. The indicator identifies the game as being available for instant play. A second user is then able to resume play of the game session from where the first user left off at the first point of gameplay. The resuming of play of the game session by the second user does not require the game to be loaded at a server of the cloud gaming system as the game session remained active after the gameplay by the first user.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

The following embodiments describe systems and methods for cloud gaming systems that enable instant play of games at specific points in the game, without requiring wait time associated with loading of the game. In one example, methods are provided to enable users to play games up to a certain point in time, and then allow another user to resume play from where the prior user left off. Various examples are described regarding implementations that enable selection of different points in time for play of different games. Some examples enable users to play a summary clip of prior gameplay leading up to the point where the game was paused and/or stopped by prior player. The instant play feature allows users to that the user wishes to demo, without requiring the user to preload, wait for the preload, progress through different levels, and/or purchase the game.

This flexibility allows users to instantly identify points in time or action that may be of interest, without the bottlenecks associated with current techniques that require access of the full game and/or preloading of the whole game before the user can begin play or testing or demonstration of game features. Still further, the various embodiments provide ways that enable users to view other players playing instances of the game, and allow users to resume gameplay from where other users leave off gameplay. In some embodiments, prior gameplays can be presented to certain users, based on their social network connections. For instance, prior gameplays from friends of the user can be presented first, so as to allow further interaction between players that may be interested in particular games.

More details regarding the instant play demo mode will be provided with reference to FIGS. 3 through 9, although other features described in the remaining figures are also pertinent to the various embodiments described herein and can be combined to define specific embodiments. It will be obvious, however, to one skilled in the art, that the present disclosure may be practiced without some or all of these specific details. In other instances, well known process operations have not been described in detail in order not to unnecessarily obscure the present disclosure. With the above general understanding of the various embodiments, example details of the embodiments will now be described with reference to the various drawings.

Figure 1A:
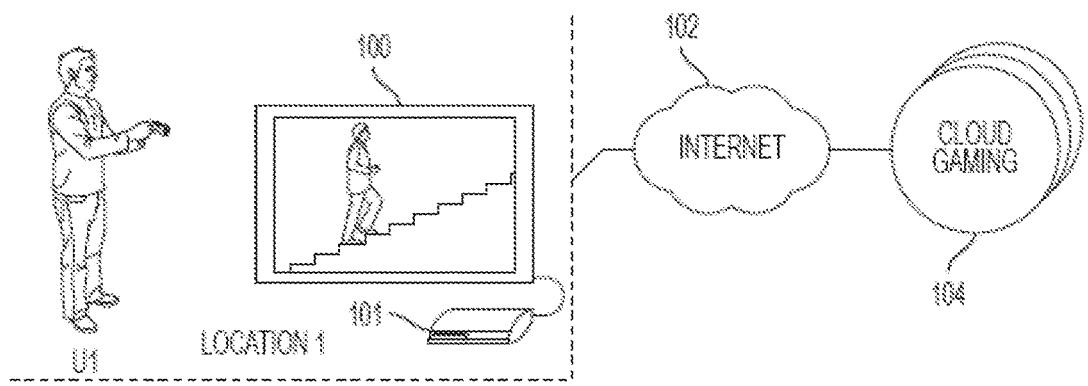
FIGS. 1A and 1B illustrate various examples of users playing cloud gaming sessions over the internet, wherein the cloud gaming session is executed by servers of a cloud gaming system.

FIG. 1A illustrates a user playing a cloud-based video game, in accordance with embodiments of the invention. As shown, a user U1 plays a cloud-based video game shown on a display 100. A cloud-based video game is a video game that is primarily executed on a remote server, a game console server, and/or groups of game console servers running in datacenters. In addition, a server, in one embodiment, can include individual servers or servers that are executed in a virtual machine datacenter, where many servers can be virtualized to provide the requested processing. In the illustrated embodiment, cloud gaming server(s) 104 execute the video game that is rendered on the display 100.

A client 101 is situated at the user's location to receive and process inputs and communicate these to the cloud gaming servers 104, and also to receive video and audio data from the cloud gaming servers 104. The client 101 and the cloud gaming servers 104 communicate over a network 102, such as the Internet. In other embodiments, the client can be any device, whether portable or not, whether wireless or not, so long as the client can communicate with a network and provide access to a display for rendering gameplay and enable input from a user to drive interactivity. In one embodiment, the client is a thin client. However, in other embodiments, the client can be a general purpose computer, a special purpose computer, a gaming console, a personal computer, a laptop computer, a tablet computer, a mobile computing device, a portable gaming device, a cellular phone, a smartphone, a set-top box, a streaming media interface/device, a smart television or networked display, or any other computing device capable of being configured to fulfill the functionality of a client as defined herein. In one embodiment, the cloud gaming server is configured to detect the type of client device which is being utilized by the user, and provide a cloud-gaming experience appropriate to the user's client device. For example, image settings, audio settings and other types of settings may be optimized for the user's client device.

In various embodiments, the degree of processing performed by the client may vary with respect to input and output processing. However, broadly speaking, the video game state is substantially maintained and executed on the cloud gaming servers 104, with the client primarily functioning to receive, decode, communicate user inputs, and receive video/audio data for rendering. The client 101 may be a standalone device that is connected to the display 100 and provides video data for rendering on the display 100. In other embodiments, the client can be integrated into the display 100. In one embodiment, the display 100 is a networked display providing a platform operating system for applications or "apps" utilizing the network connectivity of the display. In such an embodiment, the client can be defined by an application executed on the platform provided by the display's operating system.

Figure 1B:
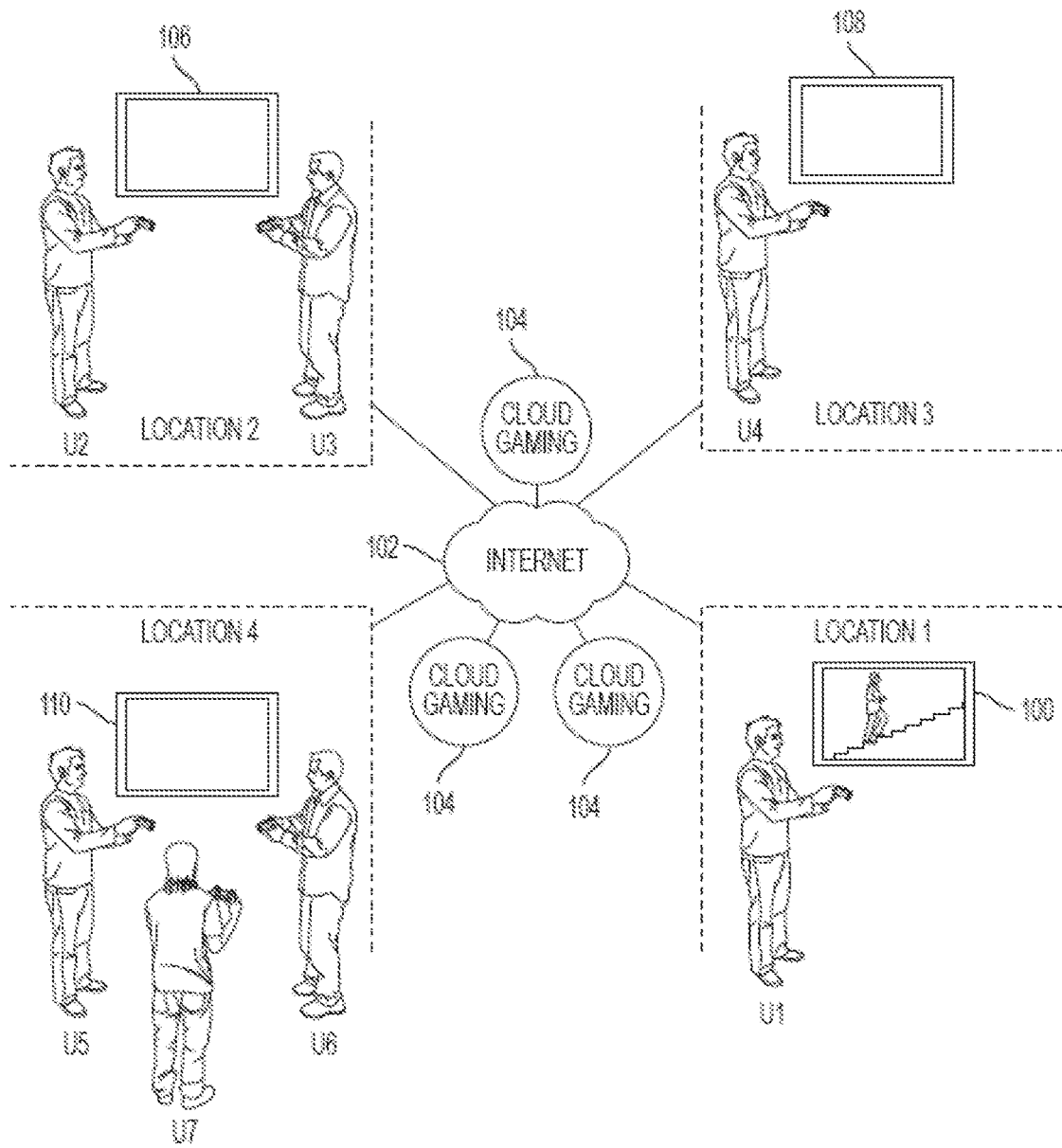

FIG. 1B illustrates multiple users in multiple locations engaged in gameplay of cloud-based video games. The user U1 is shown at a first location interacting with a video game rendered on the display 100. Users U2 and U3 are shown at a second location interacting with a video game rendered on a display 106. A user U4 is shown at a third location playing a video game rendered on a display 108. Users U5, U6, and U7 are shown at a fourth location interacting with a video game rendered on a display 110.

At each of the first, second, third, and fourth locations, at least one computing device is provided for processing input from the various users and rendering a cloud-based video game on their respective displays. It should be appreciated that the computing device can be integrated into a display, or may be a standalone device such as a personal computer, set top box, gaming console, or any other type of device having at least one processor and memory for processing and storing data. The computing device can execute or define a client, as has been described above. The computing devices are networked, and communicate over a network, such as the internet 102, with cloud gaming servers 104.

The cloud gaming servers 104 execute the various video games which are being played by the users, defining a given video game's game state from moment to moment, and sending video data (including image data and audio data) to a computing device at a particular location. The computing device at a given location processes input from the user(s) playing the video game, and transmits input data to the cloud gaming server, which in turn processes the input data to affect the game state of the video game. It should be appreciated that cloud-based gaming facilitates multi-player gaming from players located at different locations by providing for execution of the video game at a remote server that is accessible by all players over a network. In this manner, execution of the video game is not dependent on any single player's hardware or network conductivity, though such will affect the user experience for that given player.

Figure 2:
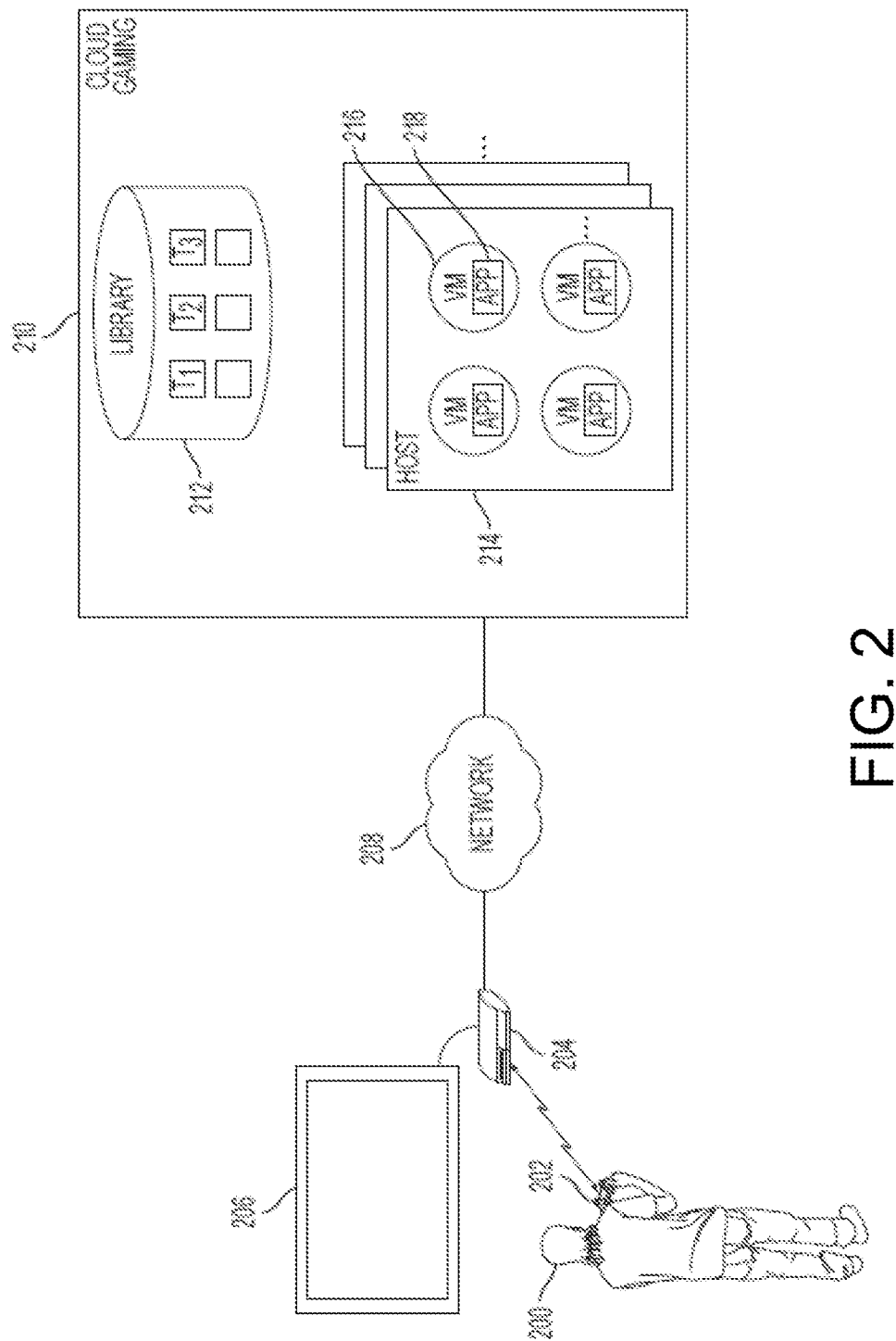
FIG. 2 illustrates an example of a user accessing a cloud gaming system, and accessing the library which provides access to specific digital content, such as game titles, movies, music, and/or generically content executable by servers and streamed to the remote user.

FIG. 2 illustrates a system for cloud gaming, in accordance with an embodiment of the invention. As shown, a user 200 operates a controller 202 to provide input to a cloud-based video game. The controller 202 can include any of various kinds of input devices, such as buttons, joysticks, a touchpad, trackball, and motion sensing hardware such as accelerometers, and magnetometers, and gyroscopes. In one embodiment, the controller 202 can include an illuminated object that can be tracked to determine the location of the controller 202. Other ways of detecting position are also possible, such as light tracking, photodiode laser tracking, magnetic tracking, etc. The controller 202 can also communicate wirelessly with a thin game client 204. The client 204 communicates over a network 208 with a cloud gaming service 210. The client 204 processes data from the controller 202 to generate input data that is communicated to a video game executed by the cloud gaming service 210. Additionally, the client 204 receives video data from the cloud gaming service 210, for rendering on the display 206. In one embodiment, the client 204 may process the received video data so as to provide a video stream in a format compatible with the display 206. For example, the data sent by the server may be compressed using compression, and the client is configured to decode the compressed data. In one embodiment, the client 204 can include a camera for tracking a controller device or an object located on the controller device. As has been noted, the object can be illuminated to further facilitate tracking based on analysis of captured image frames from the camera.

The cloud gaming service 210 includes resources for providing an environment in which a video game can be executed. Broadly speaking, resources can include various kinds of computer server hardware, including processors, storage devices, and networking equipment, which can be utilized to facilitate execution of a video game application. In the illustrated embodiment, a video game library 212 includes various game titles. Each game title defines executable code as well as associated data and asset libraries which are utilized to instantiate a video game. The host 214 can be a single computing device that defines a platform for instantiating virtual machines 216. In another embodiment, the host 214 can itself be a virtualized resource platform. In other embodiments, the host 214 can execute a plurality of game console severs, which may be executing on racks of a datacenter. Games may be stored in storage that is local to the datacenter or on other storage systems in other connected datacenters. Thus, for example, the host 214 may operate over one or more server computing devices, handling the allocation and usage of the resources defined by the server computing devices, while presenting a unified platform upon which games may be executed from remote locations.

In one embodiment, a virtual machine can be configured to emulate the hardware resource environment of a gaming console, with an operating system associated with the gaming console being run on the virtual machine to support the running of game titles which were developed for that gaming console. In another embodiment, the operating system can be configured to emulate a native operating system environment of a gaming console, though the underlying virtual machine may or may not be configured to emulate the hardware of the gaming console. In another embodiment, an emulator application is run on top of the operating system of a virtual machine, the emulator being configured to emulate the native operating system environment of a gaming console so as to support video games designed for that gaming console. It should be appreciated that a variety of current and legacy gaming consoles can be emulated in a cloud-based gaming system. In this manner, a user can access game titles from different gaming consoles via the cloud-gaming system. When the user 200 requests to play a specific video game title, the video game title is retrieved from the library 212.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid or integrated with pixels of video frames during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

Figure 3:
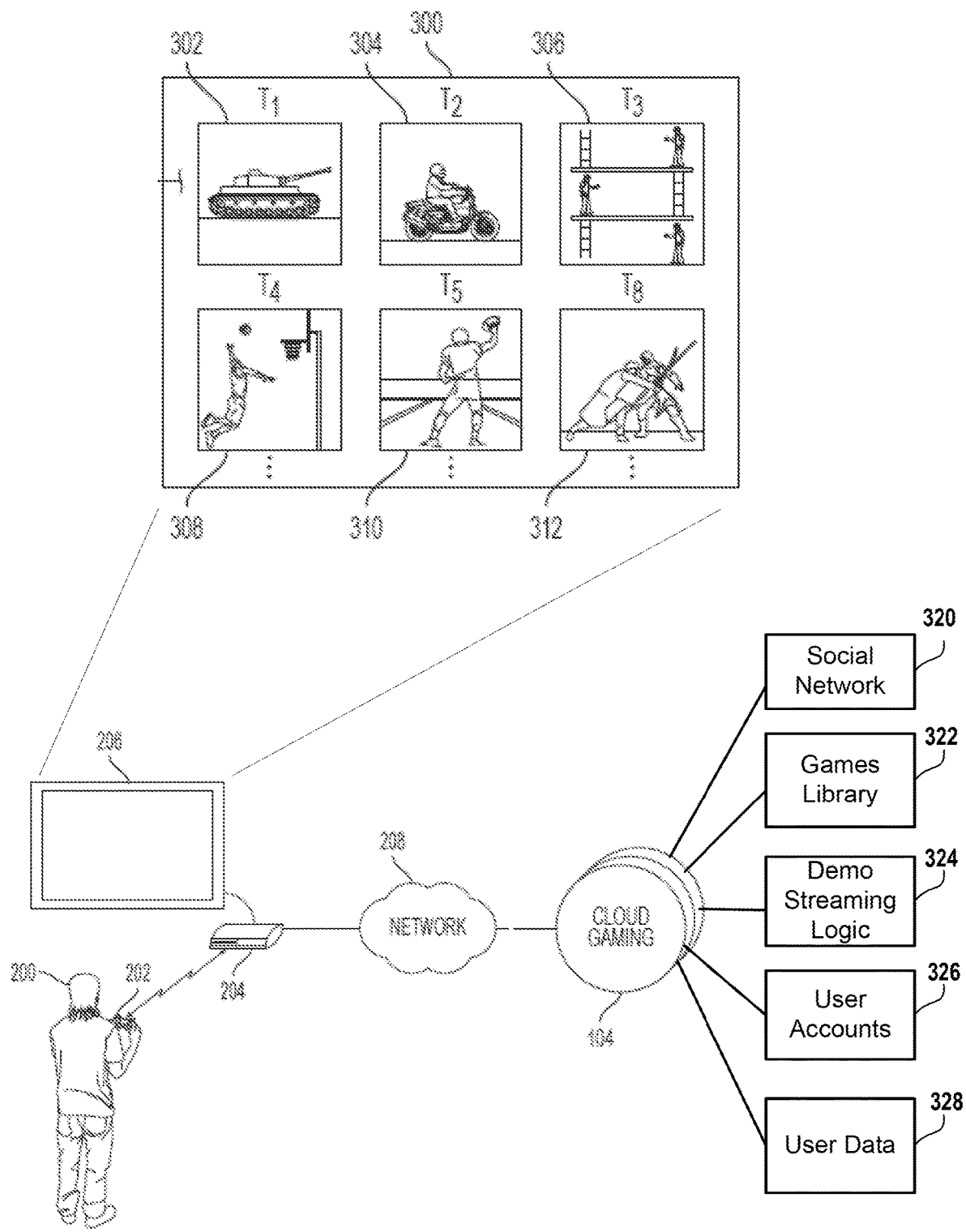
FIG. 3 illustrates an example of a user accessing the cloud gaming system in order to select a specific gaming title, from a plurality of categories of games, and being provided with access to demo streaming of particular games that can be instantly played at specific points in time.

FIG. 3 illustrates a method for providing game demos to a user, in accordance with an embodiment of the invention. An interface 300 is shown providing vignettes or icons 302, 304, 306, 308, 310, and 312 of various game titles that are available for demoing. Each icon can be configured to provide an image indicative of the game that it represents. In one embodiment, when a user navigates to a given icon, the icon may be activated to show an animation or video clip that is representative of the video game or which otherwise provides additional information to the user about the content of the video game. In one embodiment, a user may navigated to any of the icons 302, 304, 306, 308, 310, and 312, which can be highlighted to display an active animation showing a scene from the video game.

In this example, the cloud gaming system 104 is configured to be interfaced with and operate with various modules and systems. For example purposes, the cloud gaming system 104 may be interfaced with a social network 320. The social network may be one that is managed by the cloud gaming system 104, e.g., such as registered players and friends of registered players. In other embodiments, the cloud gaming system 104 may be interfaced with system operated by third parties, such as social networking sites. Such interfaces may be managed, for instance, via application programming interface (API) calls, and/or other communication links or channels. Further, games library 322 is provided to enable users of the cloud gaming system 104 to access various game titles, such as those shown in display 300. As noted above, the game titles can be provided for various types of game console generations, personal computer games, online games, or any type of digital content (e.g. movies, interactive content, hybrid interactive content, head mounted display content, etc.).

Also shown is a demo streaming logic 324, which is configured to enable multiple users to access particular games and instant play games at various levels of gameplay. For example, the demo streaming logic is configured to pre-load various games that may be used by registered users of the cloud gaming system 104. Based on use statistics and historical analysis, it is possible to identify particular games that may be used often by registered users of the cloud gaming system. In some embodiments, certain games can be in the identified as frequently used games based on a time of day, a geographical region, by certain user demographics, time of month, or combinations thereof.

Using this information, it is possible to identify games that should be executed by the cloud gaming system 104 to be preloaded and ready to be played instantly by registered users. In one embodiment, a plurality of games are preloaded and ready for instant play by registered users of the cloud gaming system 104. In particular embodiments, the games are preloaded to different levels of gameplay. For example, one particular game can have more than one instance of the game preloaded, such that the same game can have a plurality of levels preloaded and ready for instant play by users wishing to access the game at that specific level. By enabling users to access preloaded games at different levels, users wishing to experience particular games at different levels are different game events, will be able to access such games before purchase. In some embodiments, users may have heard that particular game levels are interesting and may wish to play those game levels before purchase. However, current techniques for allowing such demo play require that the user either start from the beginning, or wait for a game to be loaded. In both circumstances, the delay associated with the setup may prevent users from trying the specific game or experiencing the game level, experience, action, point in time, or interactivity associated with the instant start of the game at that particular point of interest.

Accordingly, the demo streaming logic is configured to provide the flexibility to registered users of the cloud gaming system 104 to experience different games at different levels or points in action/interactivity. Cloud gaming 104 may also be interfaced with user accounts 326, which is configured to manage the user accounts of registered users of the cloud gaming service 104. User accounts 326 may also identify privileges, user account metrics, purchased games, purchased assets, friends of the user, etc. In one embodiment, user data 328 is provided, which identifies historical play data of the user. The historical play data can include data and metadata that identifies where players previously left off or in their gameplay. Additional data can include that related to levels achieved, points earned, trophies earned, interactivity achieved, rankings, ratings, and other data personal to the user as it relates to one or more games or interactivity. In some embodiments, particular games are executed in accordance with user data, that the fines the user's digital assets, points scored, levels achieved, and other user specific metadata. In the various embodiments, the cloud gaming system 104 will utilize information from any one of these modules to enable efficient rendering of content for specific users.

The demo streaming logic 324, as will be described below, provide specific flexibility for users wishing to demo specific games. The demo process will eliminate game loading time, and will also allow users to preview games without purchasing full games. In some embodiments, users can join channels, and can view other users streaming a single instance of a game (or other users streaming other instances of the game). Users can then play the game from where the last user left off. Games will be preloaded on the streaming server which allows for users to immediately start playing. A game without delay can also be preloaded to certain levels or for more dynamic play and replay.

Figure 4A:
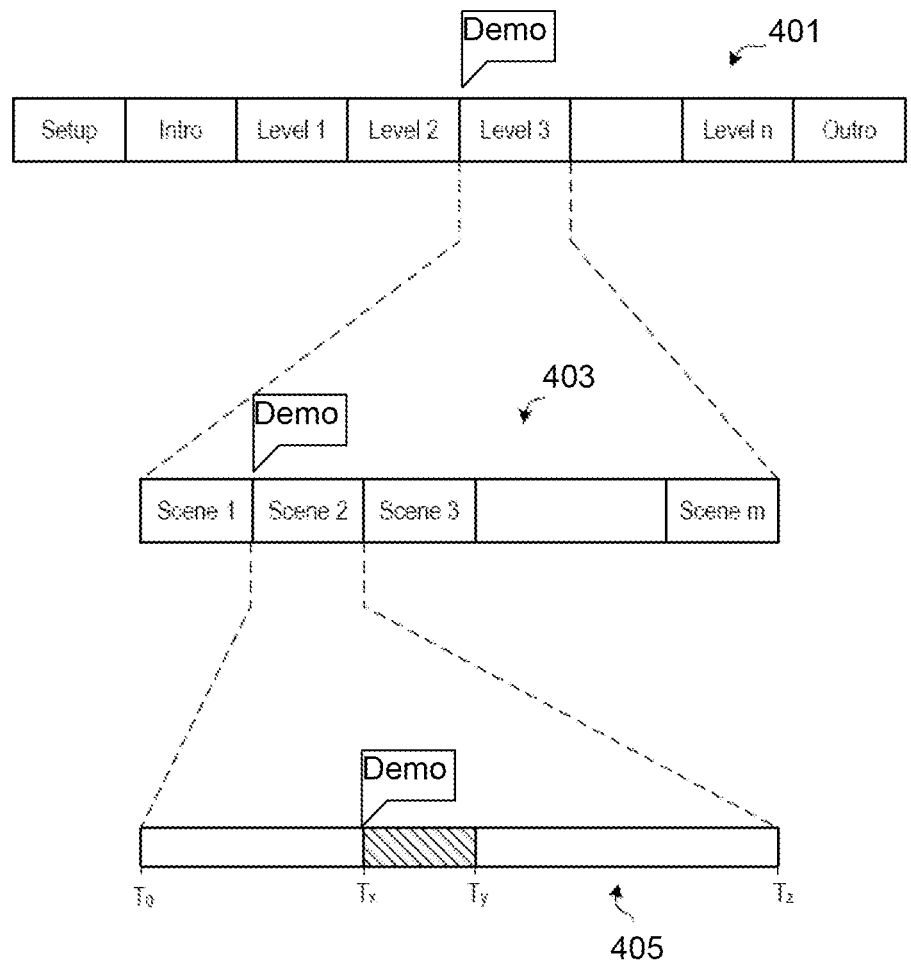
FIG. 4A illustrates an example of a game, which may include various components, and the flexibility to allow demo's to be created at any point in the game, and allowing instant play from any point in the game.

FIG. 4A illustrates an example of a game, which may include various components 401. This illustration is being made to make clear that demo for instant play can be associated with any point in a game or interactive content. In this example, a demo may be associated with a level, e.g., level 3. In another embodiment, the demo may be associated with specific scenes 403, e.g., scene 2 within level 3. In another embodiment, the demo may be associated to a specific point in time 405, e.g., Tx to Ty. If a demo is associated with a specific time, the time Tx may be where an earlier user had left off, e.g., stopped playing, thus allowing the current user accessing the game to resume from time Tx. The user can then play from time Tx to Ty or to any other time Tz. Depending on the length of time played, the user may stop playing at the end of the game or at some other level or scene within particular levels. As noted earlier, therefore, demos can be preloaded for any point within a game, not necessarily tied to a level. Although, a level may be an efficient break point to allow another user to resume play.

Figure 4B:
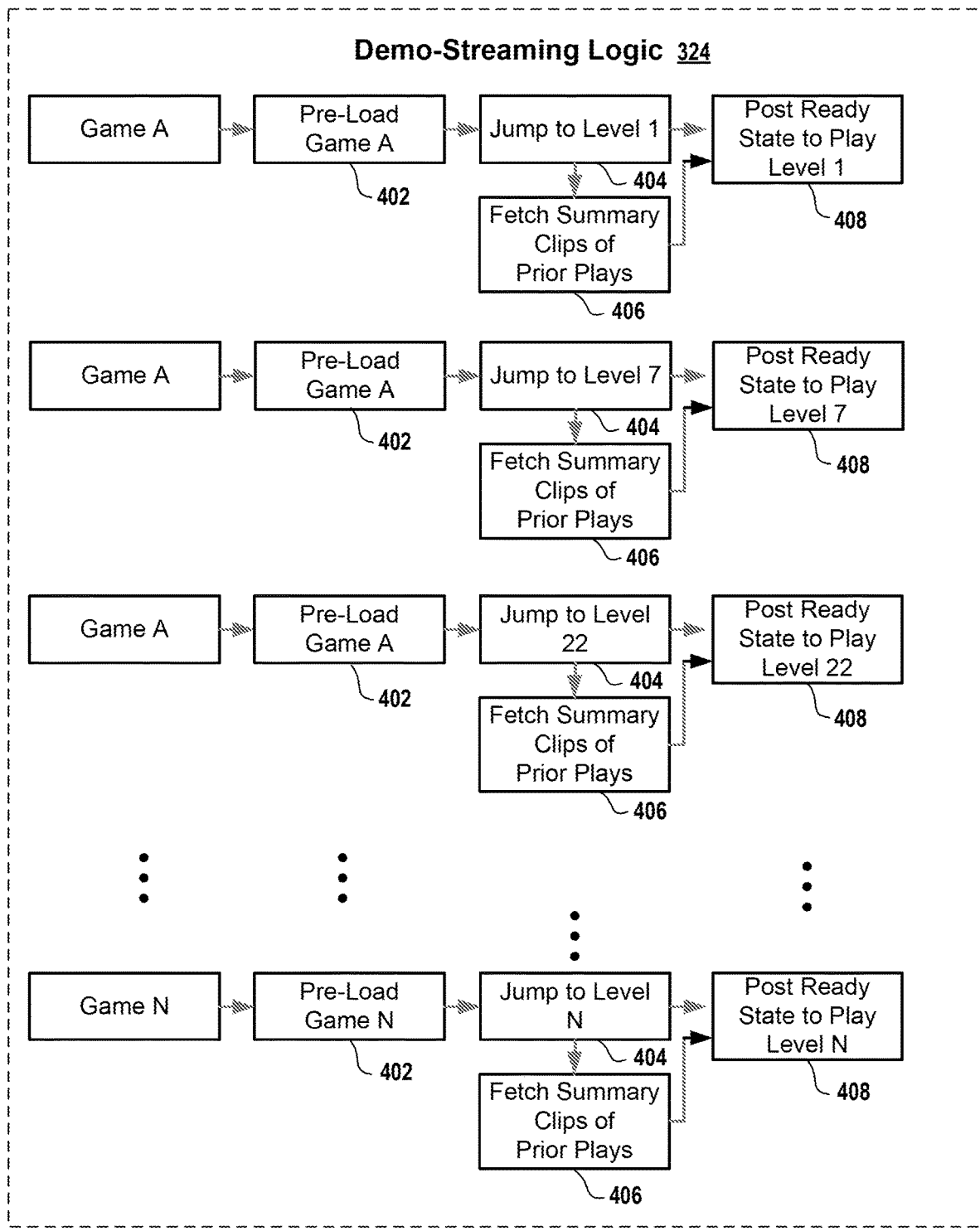
FIG. 4B illustrates examples of demo streaming logic, which can process specific games so that preloading of the game is performed up to specific levels of the game, thus allowing the resume of gameplay by other players that view a post of the previously played game activity.

FIG. 4B illustrates example processing performed by demo streaming logic 324, in accordance with one embodiment of the present disclosure. As shown, a particular game may be processed by the demo streaming logic 324, such as to provide digital content for the demo selection module 530. In one embodiment, a plurality of games is selected for demo streaming logic processing. As mentioned above, certain games serviced by cloud processing logic are identified to be provided for demo. In one embodiment, new games can be provided for demo. In other embodiments, frequently used games can be provided for demo. In other embodiments, games that experience higher levels of interest may be provided dynamically for demo. In still other embodiments, games that are popular based on use, social interaction, social postings, social references, player to player invites, player challenges, ratings, or combinations thereof may be used in one embodiment, the game selected for demo may be represented in a demo selection module of a webpage or page of the cloud gaming system 104. For example, when the user logs into the cloud gaming system 104, the user may navigate to a demo selection module, which may be represented as a page or link or interface. In the demo selection module, a plurality of games may be shown, as options for demo.

Still in FIG. 4B, it is shown that for game A, the pre-loading 402 is processed, followed by jumping to a specific level. In these examples, the game may simply advance to level 1, e.g., after bypassing all or some of the load time and introductory screens, as described with reference to FIG. 5. In other embodiments, the system may advance or jump 404 to other levels, e.g., levels 7, 22, N. For the levels selected, the system may fetch or retrieve summary clips 406 of prior plays by other users. These prior plays may be useful to view by other users, so that other users know or understand what happened leading up to the level that they wish to instant play. In operation 408, a post can be made of the ready state to play the particular level. In one example, the post can simply be to add the instant play option to a website. The website can be that of the cloud gaming system, a game network, a gaming website by others, a website of a partner, a social media site, a social media stream, etc.

Figure 5:
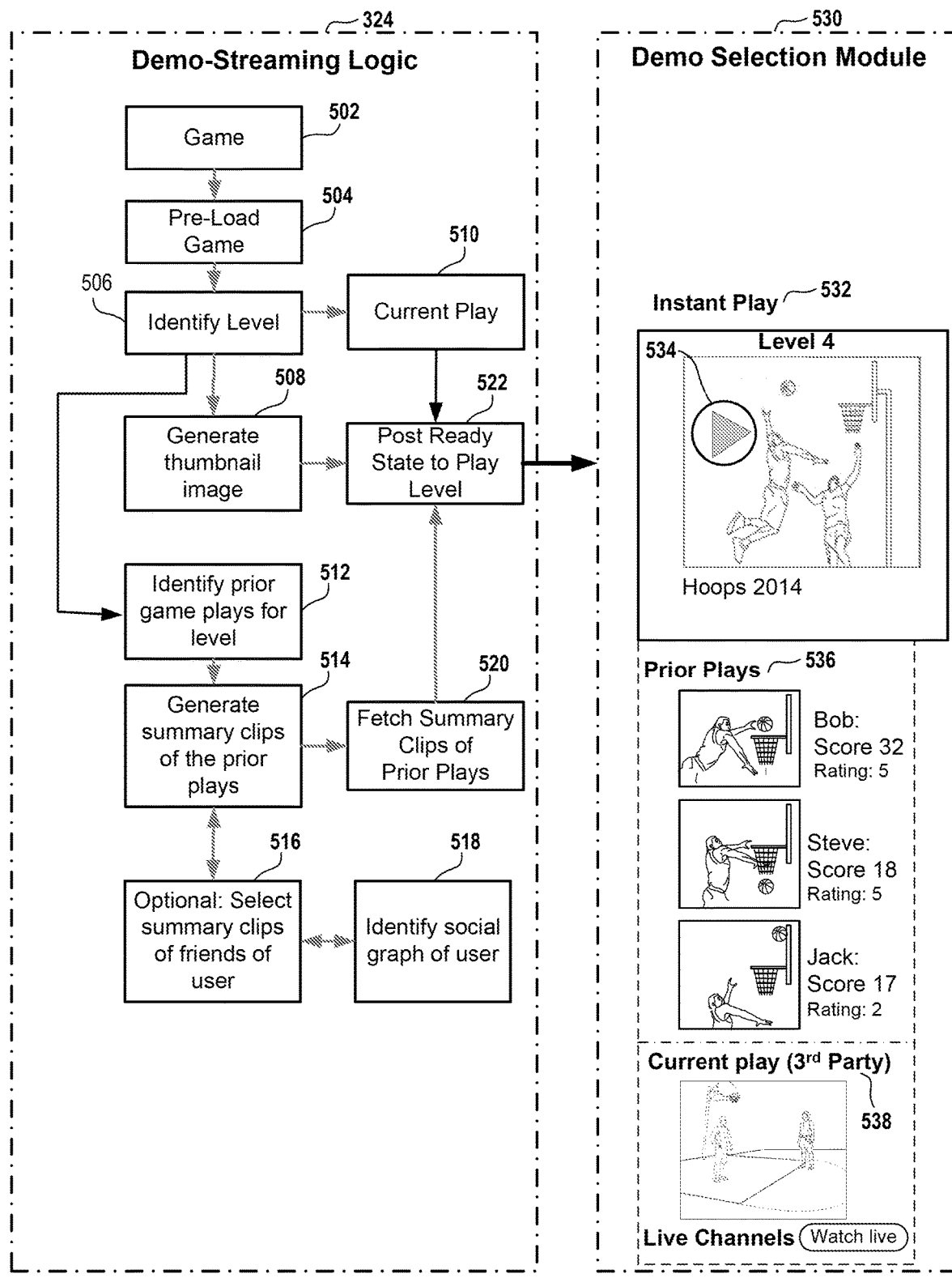
FIG. 5 illustrates an example of demo streaming logic that processes games in order to generate posts for instant play of games at particular points in time (e.g. different levels), presentation of prior place, and presentation of current play that may be ongoing between other players in a live format.

As shown in FIG. 5, once the games have been selected for demo, the demo streaming logic 324 processes those particular games in order to generate demo selection module options, such as options to instantly play the demo games at any particular level. Returning to the demo streaming logic 324, once the game 502 is selected for demo processing, the game is preloaded in operation 504. Preloading the game can include selecting the game, causing loading of the game, waiting for instantiation of all of its objects, waiting for splash screens to show, and then maintaining the game ready to play.

In one technical implementation, the pre-load of a game can include loading certain modules, e.g., code. For instance, the code is loaded depending upon the structure of the individual game. In some implementations, common elements of games may be the game code, the user interface code, the audio, the graphics, the game engine and the code specific to the level needing to be played.

In a data center, once all of the code modules are loaded, the game starts. However, in instant play as configured in various embodiments of this disclosure, the video is not being sent to the client. For instance, before gameplay can start, there is a need for the cloud gaming system to wait for X seconds (e.g., while one or more videos play), then one or more button presses need to be automatically entered by the cloud gaming system (e.g., to skip certain notices, graphic images, etc.). At this point, the cloud gaming system is nearly one button press away from gameplay action, and the game is paused. If the cloud gaming system wishes to automatically allow a user to play a level other than level 1, for instance, the cloud gaming system can automatically perform any number of button presses, e.g., via a virtual player input bot, or via predefined button presses or inputs needed to skip certain levels or advance to other levels of the game. In some games, it is possible to simply play other levels, and for these games, the cloud gaming system can advance the game to that point and pause, making that game level ready for instant lay via the demo selection module 530.

In one embodiment, when a game is connected, e.g., in response to a user pressing the instant play 534 button, one or more screen notices may be played to the user. For example, during the few seconds of that connection being made (e.g., under 5 seconds), it is possible to buy that time by showing the gamer a legal screen to cover all legal requirements (e.g., that were automatically skipped by bypassing the pre-load process). At this point, the user is placed just one button press away from instant gameplay at the desired instant play point of the game. For clarity, the setup during pre-loading and reading the game for instant play 532 occurs in the cloud gaming system, in advance of the user desiring to play a level of one of the games available for instant play 532. As a result, many games can be pre-loaded, and those games, when shown in the demo-selection module 530 website of the cloud gaming system, will be ready to play.

In some embodiments, if a user decides to instant play level 1, for instance, and then plays up to level 3, other users can be provided the option to resume play of that game in level 4, where the earlier user left off. Thus, the first user was provided with instant play for level 1, allowing the user to dive right into gameplay, as the game was pre-loaded. The next users would also be allowed to dive right into gameplay, since that user simply resumed play from where the prior user left off. The prior user leaving off, for example, simply pauses the game and leaves that instant running and available for the next player (i.e., also avoiding pre-loading of the game).

In operation 506, the operation can include identifying a level in the game. For example, the demo streaming logic can create multiple instances of the game and skip to certain levels in the game so that demos can be played starting at the identified levels. In some embodiments, skipping can include not necessarily going to a level, but going to a point in time of interactivity, a particular scene of interactivity, a particular action sequence, a particular animation, or combinations thereof.

In some embodiments, identification of a level in operation 506 can include determining instances of the game that prior players played, and levels where the prior users left off. For instance, player 1 can decide to play the game from level 1, and play up until 3. Player 2 can decide to play the game from level 1 also, and play up until level 10. Player 3 can decide to play the game from level 11, resuming where layer 2 left off. Player 4 may decide to play from level 7. Player 4 may not be playing a resume of other player, but simply be provided with an instance at level 7. The cloud gaming system can thus allow users to play levels that the cloud gaming system has automatically advanced to or allow users to play levels where other players left off. As such, the instant play 532 can be for a previously played session by another player or a level that is available for play, as the system created that level by automatically advancing to that level.

In some embodiments, the cloud gaming system can automatically analyze which games need more demo levels for instant play. If many other users have played certain games up to levels 2, 4 and 5, the system can determine that more instant plays need to be created for levels 3, 6, 7 and 8. Thus, the system can fill-in the gaps for games, pre-loading games, advancing them to certain levels, and enabling instant plays for those levels. In some embodiments, instant plays can be created automatically based on analysis of popularity of certain games. In other embodiments, instant plays can be created for new games to promote their use. In other embodiments, instant plays can be created to provide training to users.

In still other embodiments, instant plays 532 can be posted on various websites enabling users to click a link and instantly play. In that case, the other websites can be websites of others (e.g., other than the cloud gaming system website), which may enable users add a link, which causes access to the cloud gaming system. The access may be as a guest or as a registered user. If access is as a guest, the functionality can be reduced or adjusted. Still further, the other websites can be social media websites, wherein image clips or video clips are posted on in social streams. Selection of the link would then allow instant play of that game level or game portion.

Therefore, it should be understood that identification of the levels should be broadly construed to include simply identifying a point in time where the game will be shifted to so that instant play can begin from that point in time. For purposes of discussion, reference will be made to identification of levels of particular games.

Once the level has been identified in operation 506, a thumbnail image can be generated in operation 508. Generation of a thumbnail image is optional, and instead the name of the game can be generated. Additionally, in operation 512, prior gameplays for the identified level can be identified. The prior gameplays can be play interactivity that was recorded from the gameplay of other users. For instance, the other users may have reached the particular level, and that prior gameplay can represent a point in time where the user accessing the demo selection module 530 can resume playing in that particular level.

By way of example, if the user Bob was a prior player that reached a level 4, his prior gameplay could be represented as a thumbnail in prior gameplays 536. The same can be said for the prior gameplays by Steve and Jack. In one embodiment, the prior gameplays 536 can be identified by the prior players and can also show scores, ratings, and other identifying or social data. Returning to operation 506, the level can also identify the current plays 510. The current plays can include live interactive play of the game by other users that are connected to the cloud gaming system 104. In one embodiment, the user may also view the current gameplay 538, may also communicate with the players of the current gameplay, may send chat messages to the current players, may request a takeover live gameplay, and/or other communication.

In one embodiment, the summary clips of the prior gameplays 514 may be generated, such as to show the prior plays 536. Optionally, the summary clips can be selected for friends of the user in operation 516, by way of interaction with the user social graph in operation 518. In operation 520, the summary of clips of prior gameplays can be fetched and provided to the posting logic that will post a ready state to play a particular level in operation 522. Operation 522 will also receive information regarding the current plays 510. The post occurs when the information regarding the game level, the prior plays 536, and the current play 538 are provided to the demo selection module 530.

In one embodiment, the posting can simply include the instant play interface 532, and not include prior plays 536 or the current play 538. In another embodiment, the instant play 532 and the prior plays 536 are provided, without providing the current play 538. In still other embodiments, whether prior plays 536 or current play 538 are provided will depend on whether there is content from other users to post along with the capability to instant play 532 of the game level. In the current example, the instant play 532 shows a thumbnail image of the game for level 4. A user accessing the cloud gaming system 104 can simply select icon 534 (e.g., play control, or play button, or play arrow, or play link, etc.) or any other interface to instantly begin playing level 4 of the game. In one embodiment, the user can begin p level 4 of the game in a mode that enables the user to resume playing from where one of the prior plays 536 users left off. As noted above, it could be that the user wishes to play level 4 of the game, starting from the point where his friend Steve left off, where Steve had 18 points.

In some embodiments, the prior plays 536 may themselves enable instant plays, resuming from where the specific prior user left off. If one of the prior plays is selected as an instant play, other prior plays may be shown, to enable the user to view a summary of earlier play that occurred. In some embodiments, if the user views a prior play from a user that achieved a good score, the user may wish to instant play from that prior gameplay 536, instead of the representative instant play 532 options.

In other embodiments, the instant play 532 will enable the user to play level 4 without any historical play from other users. This can be a choice provided to the user, as some users do not wish to resume play from previous user play. However, even if the user does not wish to resume play of any one of the prior plays 536, the user can view video clips of the prior place to associate him or her with the game and understand where the prior users have problems, achievements, or successes. This example of level 4, for a particular basketball game rendered by the demo selection module 530 is only one example. Specifically, each one of the games provided for demo play can include multiple options to play its various levels, interaction points, action scenes, etc. Each of these levels will represent an instantiation of the game that is preloaded and being executed by the cloud gaming system 104. By preloading the games and skipping to the specific levels, waiting for the game to load is eliminated, which facilitates users jumping in to play specific games immediately. As noted above, this immediate gameplay at different levels allows users to test out games quickly without having to purchase the entire game or wait for the game to load, or wait for the user to progress through each and every level until he or she gets to the desired level that is of interest.

Figure 6:
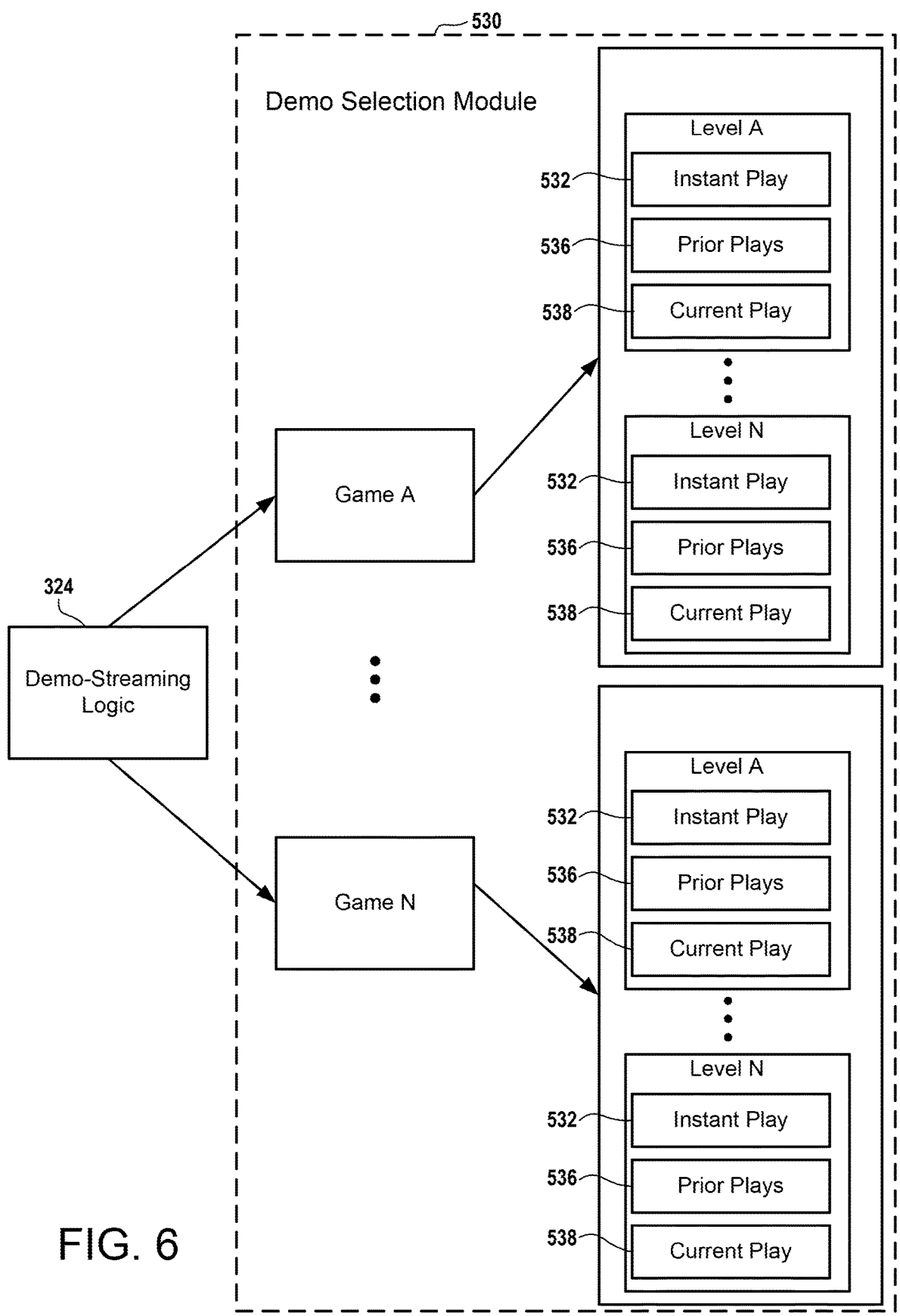
FIG. 6 illustrates an example of demo streaming logic generating different demo options for specific games at different levels, in accordance with one embodiment.

FIG. 6 illustrates a block diagram of the demo streaming logic 324 interfaced with the demo selection module 530. As mentioned above, the demo selection module 530 is designed to identify games to add to the demo mode. In this example, game A through game N is shown. Again, it should be appreciated that any number of games can be selected for demo mode, and games can be added or deleted from demo mode. In this example, the demo selection mode for game A is shown to include a plurality of levels, namely level A-Level N. Each one of the levels can include an instant play 532, and optionally prior plays 536 and current play 538. As noted above, the prior plays can be plays by other users or even the user that is currently playing, with the ability to resume playing where the last user left off. In addition, the prior plays can provide a video clip that can be played to see how the prior user performed in the previous level, before reaching the current level. In another embodiment, the prior plays can be for the level itself. In this example, the user can play the video clip to see how that particular level is played or the achievement by his friends or other players.

In another embodiment, the current play 538 can be associated with each level of the game A, and this provides the ability to view live interactive gameplay by one or more users. During the gameplay by other users, the user may communicate with other users by posting text, participating in chat sessions, providing images, providing videos, sharing knowledge, chatting about the game stages, and/or simply socializing.

In some embodiments, the user will be provided with the option to continue play of another user, by simply joining in and taking the place of one of the users that are currently playing 538. In this operation, the user can simply take over controls of one of the players in the game and continue playing until the user decides to stop. In some embodiments, when the user plays the instant play 532, the user's play of that level can become a prior play 536 for other users to see and/or resume from.

Figure 7:
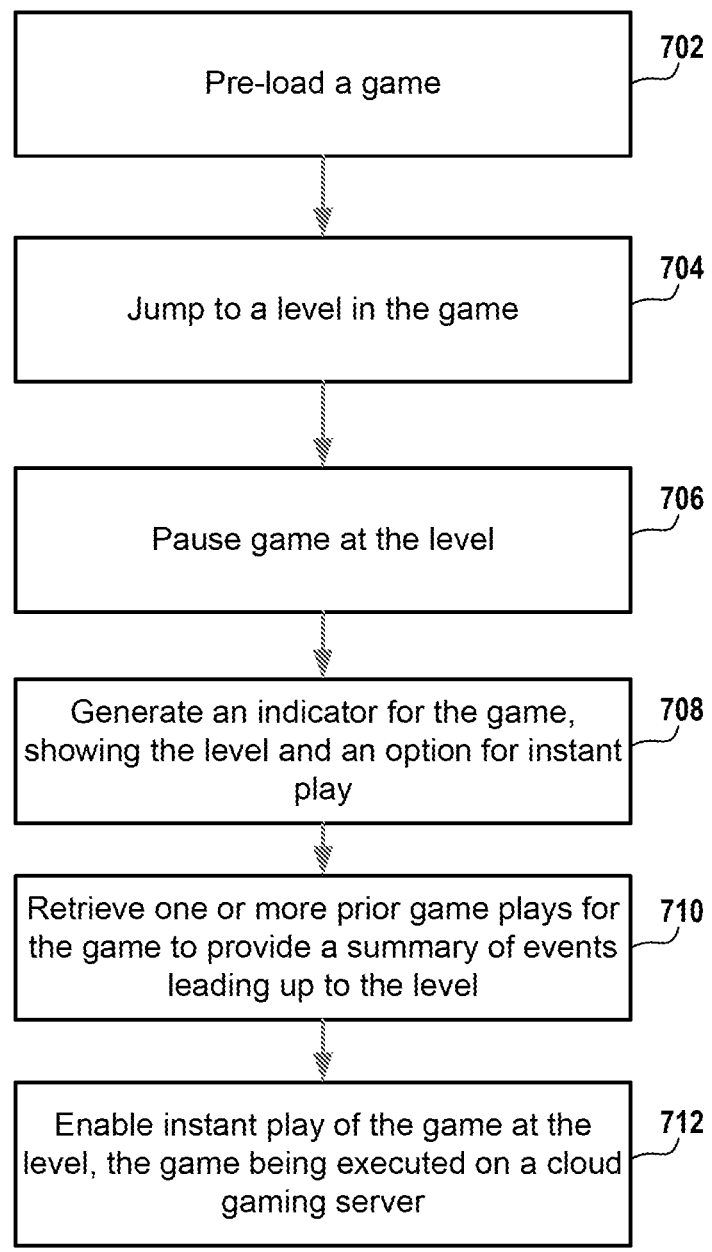
FIG. 7 illustrates a flowchart diagram associated with generating instant play options for games at specific levels, wherein the games are preloaded to enable instant play and/or resume by other players where gameplay was left off.

FIG. 7 illustrates a flowchart diagram associated with enabling instant play of games at particular levels, when using a cloud gaming server, in accordance with one embodiment of the disclosure. In operation 702, a game is preloaded. As noted above, preloading again can include selection of a game, launching of the game, waiting for the introductory content to be displayed. After the preloading is complete, the cloud gaming system will automatically generate a jump to a specific level in the game in operation 704. The jump to the level in the game in operation 704 can include fast forwarding through game stages, interactivity, selection stages, input stages, interactivity, etc., so as to arrive at a desired level. In one embodiment, this process can be repeated for the same game to arrive at a number of levels, such as levels 1, 2, 3, 4, . . . N.

In operation 706, upon arriving to each of the particular levels of the game, for which such levels are being preloaded, the game is paused. Pausing the game means that the game has not been stopped, and is running in the background ready for instant play. For instance, if a particular game has been preloaded for 3 levels, such as levels 2, 12, 27, each of the levels can be paused and ready to be played by registered users of the cloud gaming service. In operation 708, in indicator for the game is generated to show the level and the option for instant play. For example, in image thumbnail of the game can be generated to identify the game and enable selection of the game for instant play.

In another embodiment, the indicator can simply be text, which identifies the game and the level, and an associated link. In operation 710, one or more prior gameplays can be retrieved for the game to provide a summary of events leading up to the level. For example, the prior gameplays can identify a level prior to the current level that is being offered for instant play. In one embodiment, a prior user had played the game in the prior level, and the user being provided with instant play can resume gameplay from that point in time where the prior user left off. In one embodiment, this can function as a dynamic hand-off in play control to another user. In some cases, two or more remote users can hand-off gameplay back and forth, or in turns, so as to complete a game or session as a team. While one player takes control, others can watch. If the game is multi-player, multiple players can join in instantly. In another embodiment, the prior gameplays can be for the level itself. In that situation, the user can view a video clip of the game level to associate him or her with the game and understand how to play that specific game level. In operation 712, instant play of the game is enabled for the level.

The game is executed on a cloud gaming server or servers, which may be executed from particular data centers. Users accessing the cloud gaming servers would be accessing the servers over an Internet connection. The execution of the game would therefore be remote from the client (user), which is provided with the option to instantly play a specific game at specific levels, without waiting for load times.

Figure 8:
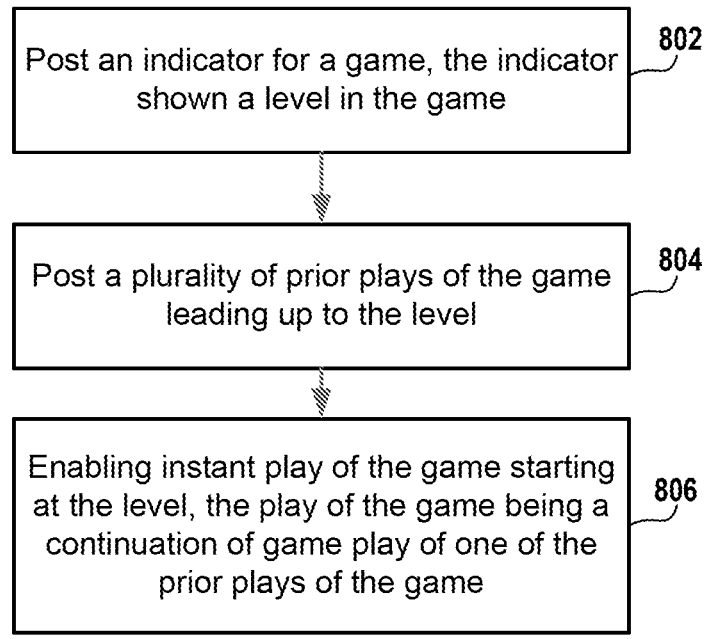
FIG. 8 illustrates an example flowchart diagram describing the posting of prior plays of the game leading up to a specific level, in accordance with one embodiment.

FIG. 8 is a flowchart diagram depicting operation performed by the cloud servers in order to generate an instant play option for a game, in accordance with the disclosure. In operation 802, in indicator for game is posted. The post will indicate a level in the game for which instant play is available. As used herein, the operation of posting simply means that the option will be provided graphically on at least one interactive page that is accessible on the cloud gaming system 104.

For example, the cloud gaming system may include a plurality of webpages that provide options for users to select content. One of the webpages or subsets of webpages may include a region that identifies several of the games for which instant play is possible in demo mode. In operation 804, for a particular game, a plurality of prior plays for the game may be posted, leading up to the level for which the instant play is available.

For instance, if previous players played level 3, and level 4 is the level that instant play is available for, then the previous plays will show various interactive sessions for level 3. In one embodiment, this will enable the user to view the prior gameplay for level 3, and then instantly begin playing level 4 right where level 3 user left off. Thus, the play of the game will be a continuation of the gameplay, starting from one of the prior plays of the game. In another embodiment, additional earlier levels can also be shown to the user, in case the user wishes to get a more detailed summary of the game actions that took place up to the point leading to level 4.

Figure 9:
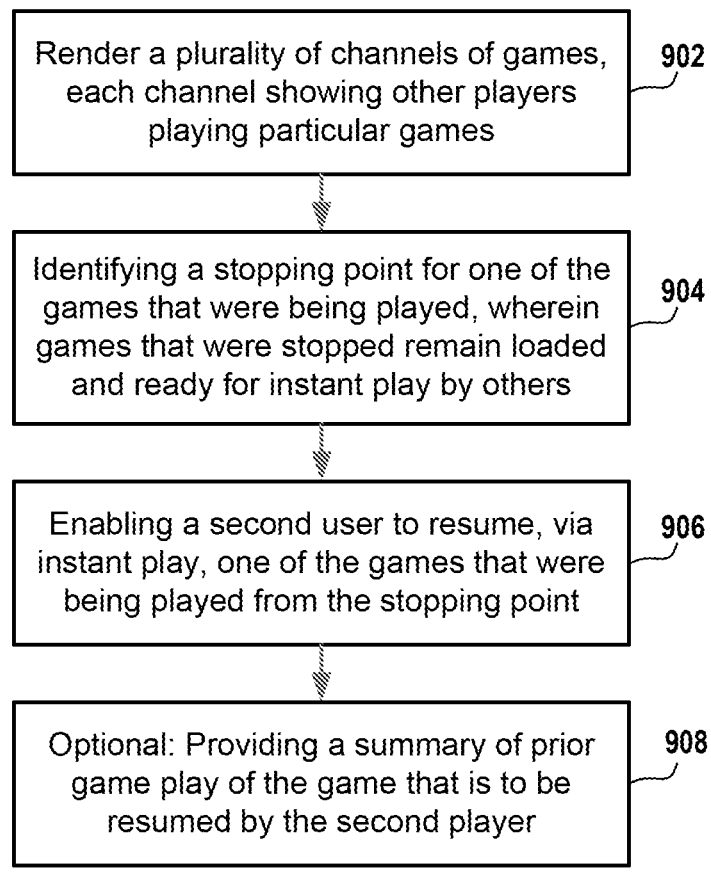
FIG. 9 illustrates an example of a system that provides a plurality of channels of games, which may show other players playing particular games and the ability to resume play where other players leave off, in an instant play format, without requiring preloading of the game.

FIG. 9 illustrates a flowchart diagram depicting operations for rendering a plurality of channels, for games that define other players playing a particular game. For instance, if more than one user is currently playing game A, those instances can be viewed as a channel Those channels can be viewed by one or more registered users of the cloud gaming service 104, when they are logged in and connected to the user interface that provides access to the gaming channels. Thus, in operation 902, the gaming channels will provide users the ability to watch other users play certain games live, and enable those users to interact with the users that are playing.

In operation 904, a stopping point may be identified for one of the games that were being played. The games that were stopped will remain loaded and ready for instant play by others. Accordingly, if any of the games that were being played live are paused or stopped by the playing users, another user that may have been watching the live gameplay may resume gameplay from where those users left off. In one embodiment, the point where the other users left off may still be saved for those specific users, and continuance of the game by the user that was watching will not affect the gameplay or state of the earlier game player.

As such, each user's saved data can be separately managed and associated to the user accounts of the respective users. In operation 906, a second user can be enabled to resume, via instant play, one of the games that were being played beginning from the stopping point. As noted, the second user will be enabled to start instantly playing the game from where the other user left off, without having to wait for the game to load. Broadly speaking, the game remains loaded on one of the servers in the data center, and is simply possible waiting for another user to take over the controls and resume playing. In general, allowing another user to resume playing an instant play mode, requires the servers and logic in the data center to associate another user to that specific instance of the game. This requires mapping functions that associate to specific user account to the specific game and enable certain functions of the game for that user. For instance, if the game is a demo, certain functions will be enabled and certain functions will not be enabled. More specifically, in demo mode, not all of the functions of the game are enabled as are in a fully paid game.

In another embodiment, all functions of the game are enabled for that demo mode, as the demo mode will only allow play of one or more levels of the game, but not the entire game. By enabling more functions of the game or all functions of the game for specific levels during a demo mode, it is possible to allow users to appreciate and get acquainted with the game to a level that would encourage them to purchase the game.

These operations form technical operations requiring multiple servers and/or execution platforms to enable quick access to databases and presentation of content to remotely located users. As mentioned in various locations herein, cloud gaming can also include the operations of compression utilizing any number compression techniques. The compression techniques may use standard encoders, which would then allow the standard decoders on client devices to access and play the video games. The management of the video games and distribution can include a number of data centers, direction servers, quality of service testers, direction and redirection to lower latency data centers, and management of the instant play demos. It should also be understood that these operations and tasks will utilize special purpose computers that are designed for streaming and low latency due to the remote execution of games, and the delivery to the client devices.

Figure 10:
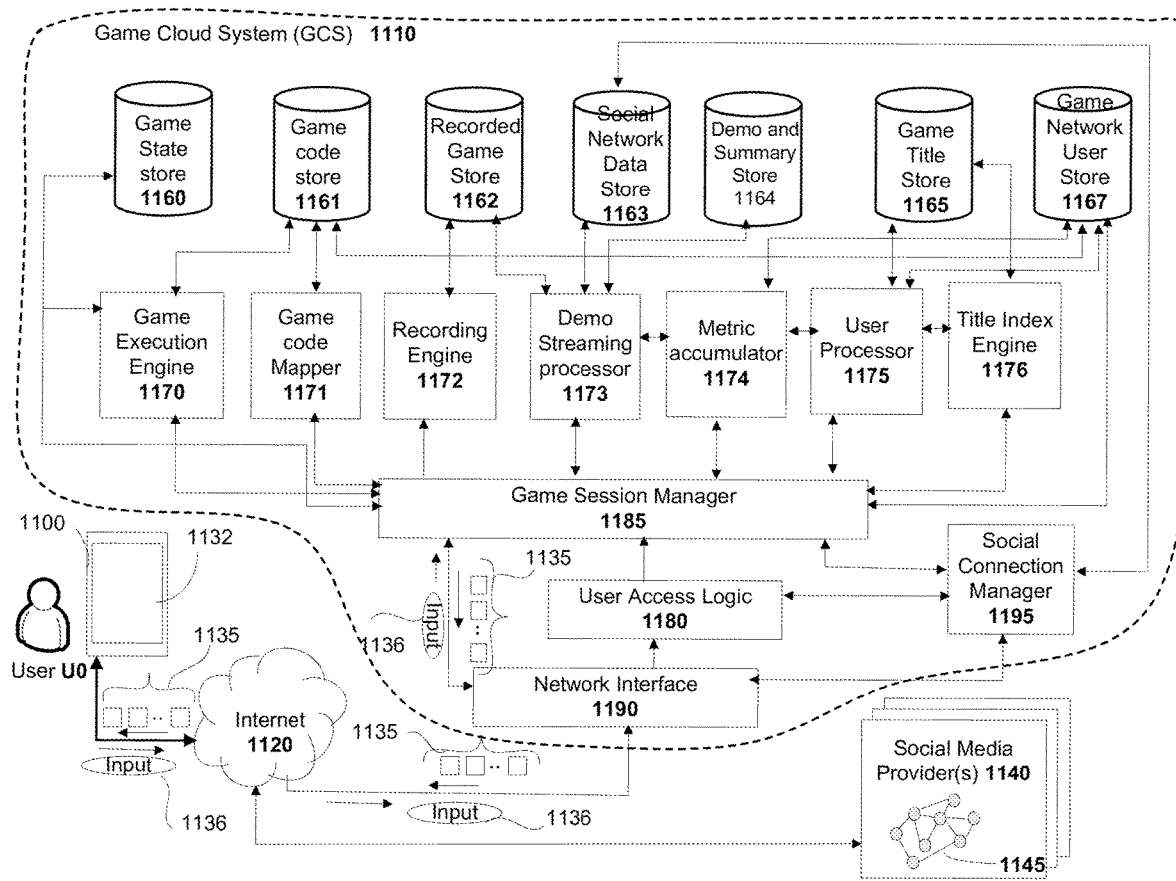
FIG. 10 illustrates a simplified block diagram of a game cloud system 1110 that may be used for managing execution and sharing of videos and game clips, in accordance with an embodiment of the disclosure.

FIG. 10 illustrates a simplified block diagram of a game cloud system 1110 that may be used to managing execution and sharing of videos and game clips, in accordance with an embodiment of the disclosure. In one embodiment, the cloud gaming system 1100 may be defined by multiple servers that are part of a datacenter, and are configured to execute games or media that can be played remotely by connected users. The servers can be defined by general purpose servers and special purpose servers, which are networked game consoles. In the case of networked game consoles, a data center can be defined by multiple racks of game consoles, which may be configured to execute certain games and serve a number of connected users. In some cases, certain game consoles are pre-assigned to specific games, and specific numbers (e.g., one or more) users can be assigned to said game consoles. The server infrastructure is then designed to enable execution of games and encoding (e.g., compressing) content sent to the remote user device. The remote user device will then decode data and display the interactive content on a display of a client, used by the remote users. Similarly, user input, e.g., such as controller input, is sent back to the server to enable driving the interactivity of the game. In a broad sense, cloud gaming includes processing the game execution on a remote server of a datacenter and presenting the audio and video output on the remote client. When bandwidth between the client and the server is at some minimum level, and delays are less than 300 milliseconds, the interactivity presented on the screen of the remote client is as if the content were being executed locally on the client. In some embodiments, the game cloud system 1110 may include a plurality of virtual machines (VMs) running on a hypervisor of a host machine (or simply a host), with one or more virtual machines configured to execute a game processor module utilizing the hardware resources available to the hypervisor of the host.

Some examples of game client device include a personal computer (PC), a television, a home theater PC, general purpose computer, mobile computing device, a smart phone, a tablet, or any other types of computing devices that can interact with the game server over the internet to execute a video game. As such, the game server may be any type of server computing device available in the cloud, including a virtual machine executing on a host, and accessed remotely through the network 1120.

In some configurations, when a user logs into the cloud game system 1110, the user may be presented with an option to designate the type of client device through which the user is accessing the cloud game network. In one embodiment, a series of client device options are presented from which the user may select one corresponding to his/her client device. Similarly, the user may also be presented with an option to designate the type of controller device they will use to play a video game. In one embodiment, a series of controller options can be presented to the user, from which the user may select to designate a controller type corresponding to their controller hardware.

In other embodiments, the cloud game system 1110 can be configured to automatically detect the client device type and/or the controller device type. For example, at the time of login, the client device may send information to the game server identifying itself as well as a connected controller device (e.g. in response to a request from the game server).

Based on this information, the game server within the game cloud system 1110 may determine an appropriate video game output configuration (e.g., compression, resolution, aspect ratio, etc.) and input parameter configuration to provide a gaming experience optimized for the user's client device and controller device. In one embodiment, a look-up table is employed to determine video game configuration and input parameter configuration based on a detected client device and a detected controller device. These configuration and input parameters are used to generate the pre-defined setup parameters. The setup parameters provide information at the client device to define controls for playing the video game. In addition to the setup parameters, a social media interface may also be provided at the client device to enable social interaction with other users.

Still referring to FIG. 10, various example modules and their interactions with one another are shown. For example, a social media provider 1140, a user device 1100, and the game cloud system 1110 are connected via Internet 1120. Although one user device 100 is illustrated, it is to be understood that in practice, many more user devices may be connected to Internet 1120 to access the services provided by GCS 1110 and social media providers 1140.

In one embodiment, game cloud system 1110 includes a plurality of modules that receive and process various data related to managing execution and sharing of recorded gameplays, e.g., demo prior play videos. In one embodiment, the different modules of the game cloud system 1110 may include one or more execution engines that execute on a game server using data available to the game server. It should be understood that some systems may have more or less of these modules, so this example should not be viewed as limiting to many more implementations that are configured to enable online gameplay.

For example, several execution engines may be used to execute different game and management tasks. Some example engines may include, without limitation, a game execution engine 1170, a game code mapper 1171, a recording engine 1172, a demo streaming processor 1173, a metric accumulator 1174, a user processor 1175, and a title index engine 1176.

The game cloud system 1110 may further include a plurality of data storage systems to store various data and/or processed data. As shown, without limitation, data stores may include game state store 1160, game code store 1161, recorded game store 1162, social network data store 1163, demo and summary video data store 1164, game title store 1165, game network user store 1167. A game session manager 1185 may be configured to interact with the game execution engines and the data stores, as well as with social connection manager 1195. The game session manager 1185 is also configured to grant and/or control access to various users, e.g., via a user access logic 1180.

In one embodiment, a user U0, may be accessing the game cloud system 1110 via a user device 1100, which has a specific screen 1132. Input provided by the user can be via a controller, a keyboard, a touchscreen, or any other input. The input 1136 is communicated over the Internet 1120 to the game cloud system 1110. In one embodiment, the input 1136 can be communicated in packets of data that may be compressed and then forwarded to the game cloud system 1110 and received by the network interface 1190. In one embodiment, the network interface 1190 may be associated with a specific server of the game cloud system 1110, a specific game console, or various servers in a data center. The input 1136 is then passed to the game session manager 1185 which provides for the processing of the game logic and return of audio and video packets 1135. The audio and video packets are encoded (e.g. compressed) and forwarded back to the client device 1100, were a decoder of the client device decodes and presents the data back to the screen 1132.

In some embodiments, the system can operate as a hybrid system, wherein social relationships are managed using social graph data 1145 from third party social media providers (via application programming interface (API) accesses or the like). In still other embodiments, the game cloud system 1110 can manage its own social network data, which can include lists of users with user accounts for the game cloud system 1110, and also relationships identifying friends that play certain games or interact with each other.

In one embodiment, a user, e.g., user U0, may create a user account and register the created user account with game cloud system 1110. After the user account is registered with game cloud system 1110, game cloud system 1110 may provide a user ID to this registered user account and save the user ID in a user profile associated with the registered user account. In one embodiment, the user profile associated with a user account may be saved in a user database in game network user store 1167.

After logging in, the user can access services provided by game cloud system 1110 via game session manager 1185. For example, game session manager 1185 may inform user processor 1175 of the user login information so that user processor 1175 may record or update the user login information in the user profile associated with this user. User processor 1175 may also communicate with title index engine 1176 to identify game titles associated with the user account. The game titles associated with the user account may be previously purchased by the user, previously played by the user and/or free game titles identified and made available by the game providers. In one embodiment, the game titles associated with the user account may also include game titles associated with a genre defined by the user's interest based on user's prior selection of games. Additionally, the user processor 1175 may identify user data, which includes historical play data, levels achieved in particular games, points accumulated, states of games that are in progress, trophies earned, credits earned, etc.

Game session manager 1185 accesses game state store 1161 to retrieve saved game state of a last session played by the user (for a selected game), if any, so that the user can restart the gameplay from a previous gameplay stop point. Once the resume or start point is identified, the game session manager 1185 may inform game execution engine 1170 to execute the game code of the chosen game title stored in game code store 1161. After a game session is initiated, game session manager 1185 may pass game video frames (i.e., streaming video data), via network interface 1190 to a user device, e.g., user device 1100.

During gameplay, game session manager 1185 may communicate with game execution engine 1170, and recording engine 1172, to generate or save a recording (e.g., video) of the gameplay or gameplay session as the gameplay processes. In one embodiment, the video recording of the gameplay can include other game related metadata provided and/or captured during gameplay. This additional data can include a video of the user playing the game. For example, this video of the user playing the game may be used to generate a prior play video, which can be processed by a demo streaming processor 1173.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the embodiments described herein may be executed on any type of client device. In some embodiments, the client device is a head mounted display (HMD).

Figure 11:
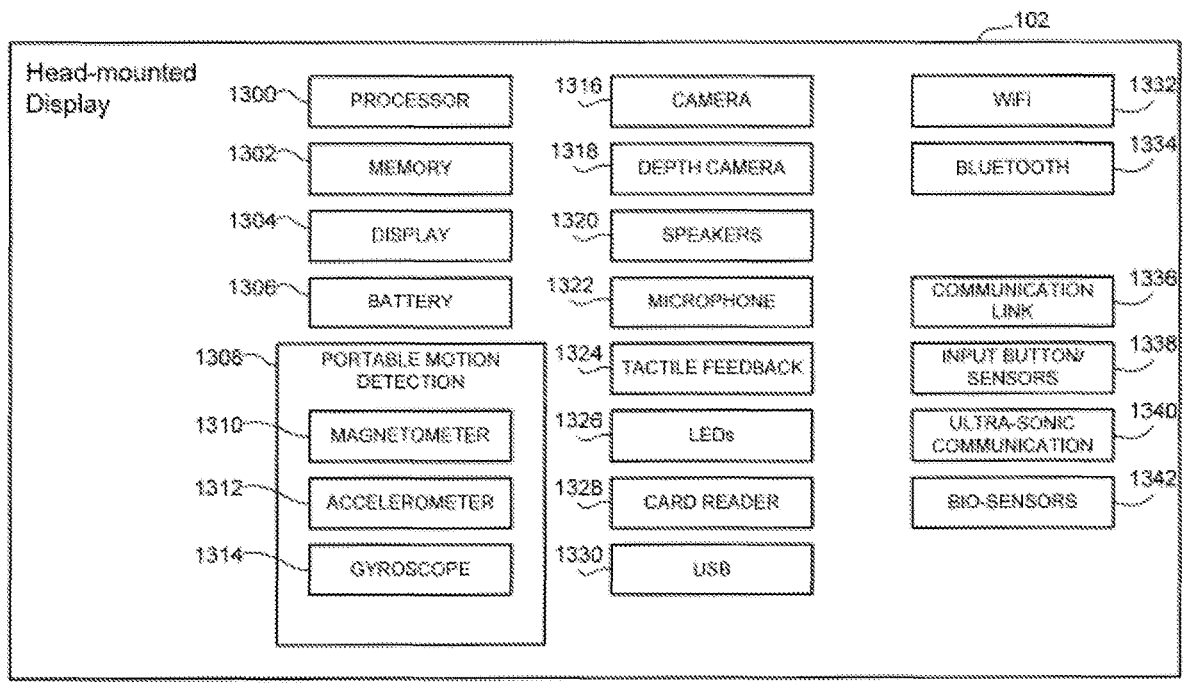
FIG. 11, a diagram illustrating components of a head-mounted display 102 is shown, in accordance with an embodiment of the invention.

FIG. 11, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 12:
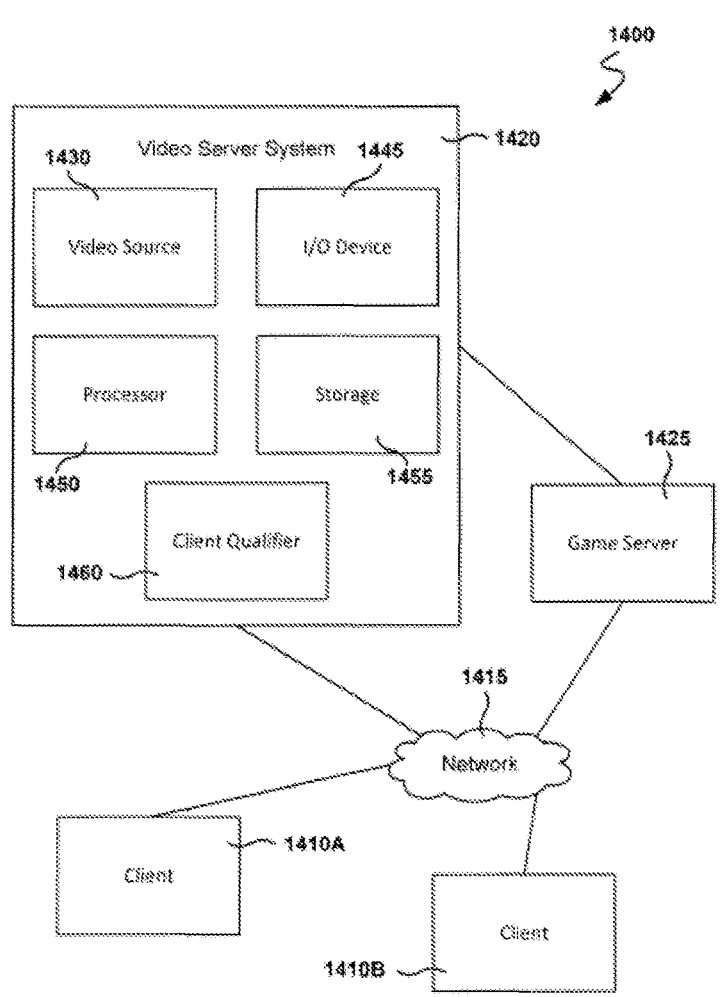
FIG. 12 is a block diagram of a Game System 1400, according to various embodiments of the invention.

FIG. 12 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change instantly with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect gameplay. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

It should be understood that the various embodiments defined herein may be combined or assembled into specific implementations using the various features disclosed herein.

Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for generating demonstration gameplay streaming via a cloud gaming system, comprising:
executing a game from a library of games managed by the cloud gaming system, the executing causing the game to launch and progress to a gaming session where modules of the game are loaded and waiting for interactive input for the game, wherein said progress is made automatically by the cloud gaming system via predefined button presses to reach said waiting for interactive input for the game;
enabling gameplay of the game by a first user during the gaming session, the first user progressing in the game up to a first point of gameplay and pausing;
maintaining the gaming session active and executing, such that the modules of the game remain loaded and launched waiting for interactive input for the game;
saving a recording of a portion of the gameplay up to the first point of gameplay; and
posting an indicator for the game to a webpage of the cloud gaming system, the indicator identifying the game as being available for instant play, wherein a second user is provided access to resume play of the gaming session from where the first user paused and left off at the first point of gameplay without requiring the gaming session to be restarted at the server of the cloud gaming system after the gameplay by the first user.

2. The method of claim 1, wherein the modules of the game are code components that require loading at the server, the modules include game code for the game, user interface code for the game, audio for the game, graphics code for game, game engine code for the game, and level-specific code for the game.

3. The method of claim 1, further comprising,
providing, on the webpage, an option to view the recording of the portion of gameplay leading up to the first point of gameplay by the first user.

4. The method of claim 1, further comprising,
fetching a plurality of prior plays of the game that lead up to the first point of gameplay; and
displaying the plurality of prior plays of the game as options to view a summary of action that occurred leading up to the first point of gameplay.

5. The method of claim 1, wherein the indicator is an thumbnail of a scene of the game or an image identifying the game, the indicator being associated with a play control to activate the instant play of the game by the second user.

6. A method for generating demonstration gameplay streaming via a cloud gaming system, comprising:
executing a game from a library of games managed by the cloud gaming system, the executing causing the game to launch and progress to a gaming session where modules of the game are pre-loaded and waiting for interactive input for the game, wherein said progress is made automatically by the cloud gaming system via predefined button presses to reach said waiting for interactive input for the game;
advancing, by the cloud gaming system, in the game from a first level to a second level in the game;
pausing the game on the cloud gaming system;
generating a first post that is indicative of the game and the second level, the first post being displayed on a website, the executing of the game, the advancing and the pausing being processed by the cloud gaming system without user input so that the game is playable at the second level;
receiving an input from a first user to initiate gameplay of the second level by selection of the first post;
enabling advancement of the gameplay of the game from the second level to a third level;
pausing the game on the game cloud system; and
generating a second post that is indicative of the game and the third level, wherein the game remains in an active session during a time of each of said pausing, such that a second user or the first user is enabled to select the second post and continue advancing of the game through other levels of the game without requiring loading and relaunching of the game as said game is maintained in said active session and executing during the each one of said pausing.

7. The method of claim 6, further comprising,
providing, on a webpage, an option to view a recording of gameplay leading up to the second level, as associated with the first post.

8. The method of claim 6, further comprising,
fetching a plurality of prior plays of the game that lead up to the second level or the third level; and
displaying the plurality of prior plays of the game as options to view a summary of action that occurred leading up to the second level or the third level.

9. The method of claim 6, further comprising,
providing a video of current play by another user of the game, the current play being associated with a level of the game;
wherein when the current play is stopped by the other user of the game, the cloud gaming system generates an option to instant play the game from where the other user stopped.

10. The method of claim 6, further comprising,
wherein the pre-loading is processed by the cloud gaming system without user input and before presentation of options that provide for instant play of the game.

11. The method of claim 6, wherein the pre-loading includes loading the modules of the game at a server of the cloud gaming system, the modules include game code for the game, user interface code for the game, audio for the game, graphics code for game, game engine code for the game, and level-specific code for the game;
wherein the pre-loading is processed by the cloud gaming system without user input in advance of presentation of options to provide for instant play of the game.

12. The method of claim 6, wherein the cloud gaming system is defined by one or more servers of a data center that is accessible over the Internet to client devices of users that are registered with the cloud gaming system, wherein the one or more servers of the data center are configured to perform the pre-loading of the game in preparation of making instances of the game available for instant play at one or more levels;
wherein the cloud gaming system, upon receiving input from one of the client devices to play the game associated with the first post, the second post or other posts of the game, is configured to generate a stream of video frames that are compressed using an encoder, such that encoded video frames are sent from the server to the client, the client is configured to drive interactivity of the game by suppling input back to the server and the client is further configured to use a decoder to decompress and render images on a display of the client, wherein the compressing enables streaming of the game to the client.

13. The method of claim 6, further comprising,
accessing a social media site to determine friends of the first user or the second user, such that the each of the first or second users are provided with one or more prior plays of the game by friends as determined by a social graph of the social media site,
wherein the prior plays are enabled as instant plays, such that the first or second user is able to resume gameplay where one of their respective friends left off gameplay.

14. The method of claim 13, wherein the access to the social media site is via an application programming interface (API) call, the API call is processed so as to capture information regarding the social graph of the first or second users.

15. The method of claim 1, wherein said predefined button presses are facilitated using a virtual player input bot for skipping one or more notices or graphics.

16. The method of claim 6, wherein said predefined button presses are facilitated using a virtual player input bot for skipping one or more notices or graphics.

* * * * *